United States Patent
Chang

(10) Patent No.: US 8,001,502 B2
(45) Date of Patent: Aug. 16, 2011

(54) METHOD FOR PERFORMING TIMING ANALYSIS OF A CIRCUIT

(75) Inventor: Mau-Chung Chang, Hillsborough, CA (US)

(73) Assignee: Sage Software, Inc., Hillsborough, CA (US)

( * ) Notice: Subject to any disclaimer, the term of this patent is extended or adjusted under 35 U.S.C. 154(b) by 403 days.

(21) Appl. No.: 12/186,431

(22) Filed: Aug. 5, 2008

(65) Prior Publication Data

US 2008/0307375 A1 Dec. 11, 2008

Related U.S. Application Data

(62) Division of application No. 11/347,029, filed on Feb. 3, 2006, now Pat. No. 7,590,953.

(60) Provisional application No. 60/650,308, filed on Feb. 3, 2005.

(51) Int. Cl.
*G06F 17/50* (2006.01)
(52) U.S. Cl. ......... 716/104; 716/101; 716/111; 716/113
(58) Field of Classification Search .................. 716/101, 716/104, 111, 113
See application file for complete search history.

(56) References Cited

U.S. PATENT DOCUMENTS

| | | | |
|---|---|---|---|
| 5,872,717 A | 2/1999 | Yu et al. | |
| 5,946,482 A | 8/1999 | Barford et al. | |
| 6,591,402 B1 * | 7/2003 | Chandra et al. | 716/5 |
| 6,594,806 B1 | 7/2003 | Casavant | |
| 2002/0112213 A1 | 8/2002 | Abadir et al. | |
| 2003/0208727 A1 | 11/2003 | Mortensen | |

OTHER PUBLICATIONS

Arunachalam, R., et al., "TACO: Timing Analysis with Coupling", Proc. DAC, Jun. 2000, pp. 266-269.
Batterywala et al., "A Method to Estimate Slew and Delay in Coupled Digital Circuits," IEEE Proc of 16th Int'l Conf. on VLSI Design, p. 1-6, (2003).
Borriello, "Synthesis of Mixed Synchronous/Asynchronous Control Logic," IEEE ISCAS, p. 762-765, (1989).
Cherry, JJ, "Pearl: A CMOS Timing Analyzer," Proc. DAD, Jun. 1988, pp. 148-153.
Claesen et al., "Accelerated Sensitizable Path Algorithms for Timing Verification Based on Code Generation," IEEE ISCAS, p. 885-888, (1989).

(Continued)

*Primary Examiner* — Thuan Do
(74) *Attorney, Agent, or Firm* — Mark J. Danielson; Pillsbury Winthrop Shaw Pittman LLP

(57) ABSTRACT

A single verification tool provides both static timing analysis and timing simulation capabilities targeted at both full-custom and ASIC designs in a unified environment. In various embodiments the verification tool includes the following features: (a) Integrating both static timing analysis and dynamic simulation tools into a single tool, (b) Efficient path search for multi-phase, multi-frequency and multi-cycle circuit in the presence of level sensitive latch, (c) Automatically identifying circuit structure, e.g. complex gate, for timing characterization, (d) Circuit structures at transistor level solved by incorporating function check, (e) Carrying out functional check to filter out false path and identifying gate with simultaneously changing inputs, (f) Finding maximum operating frequency in the presence of level sensitive latches after filtering out false paths, (g) Crosstalk solver by utilizing the admittance matrix and voltage transfer of RLC part in frequency domain coupled with the non-linear driver in time domain implemented in spice-like simulator, (h) Making use of the correlation between inputs of aggressors and victim to determine switching time at victim's output iteratively.

13 Claims, 14 Drawing Sheets

OTHER PUBLICATIONS

Dartu et al., "Calculating Worst-Case Gate Delays Due to Dominant Capacitance Coupling", Proc. DAC, Jun. 1997, pp. 46-51.
Dartu et al., "TETA: Transistor-Level Engine for Timing Analysis", Proc. DAC, Jun. 1998, pp. 595-598.
Devgan et al., "Block-Based Static Timing Analysis with Uncertainty," ICCAD '03, Nov. 11-13, 2003, pp. 607-614.
"Fujitsu Standardizes on Synopsys' Primte Time Delay Calculator in its ASIC Design Flow", Synopsys Press Release, 2003 (printed Jan. 17, 2006), pp. 1-2.
Hassoun et al., "Static Timing Analysis for Level-Clocked Circuits in the Presence of Cross Talk", IEEE Trans. On CAD, 2002, pp. 1-8.
"Hierarchical Static Timing Analysis Using Interface Logic Models," Synopsys Press Release, Jan. 2001, pp. 1-11.
Jouppi, NP, "TV: An NMOS Timing Analyzer", Proc. Of 3rd Caltech Conf. on VLSI, 1983, pp. 72-85.
Lin et al., "Transient Simulation of Lossy Interconnect," Proc. DAC, Jun. 1992, pp. 81-86.
"Noise Aware Timing Analysis", Cadence White Paper, 2001, pp. 1-6.
Ousterhout, "A Switch-Level Timing Verifier for Digital MOS VLSI," IEEE Trans. On Comp. Aided Design CAD, 4(3), Jul. 1985, pp. 336-349.
P1497 Draft Standard for Standard Delay Format (SDF) for the Electronic Design Process, IEEE Standards Board, V0.10, 1999, pp. 1-86.
"Project Management for Timing Analysis" Timing Designing, Project Management Oct. 2004, pp. 1-4.
"Signalstorm NDC", Cadence Datasheet, 2004, pp. 1-3.
Szymanski, "LEADOUT: A Static Timing Analyzer for MOS Circuits," IEEE Inter. Conf. on Computer Aided Design, Nov. 1986, pp. 130-134.
Xiao et al., "Efficient Static Timing Analysis in Presence of Crosstalk," IEEE, p. 335-339, (2000).

\* cited by examiner

• and
+ or

METHOD FOR PERFORMING TIMING ANALYSIS OF A CIRCUIT

CROSS-REFERENCE TO RELATED APPLICATIONS

This application is a divisional of U.S. patent application Ser. No. 11/347,029 filed on Feb. 3, 2006, issued as U.S. Pat. No. 7,590,953, which claims priority to U.S. Provisional Application No. 60/650,308, filed Feb. 3, 2005, the contents of which are incorporated herein by reference.

BACKGROUND OF THE INVENTION

The present invention relates to integrated circuit design, and more particularly to a design timing verification tool that is capable of handling both dynamic simulation and static timing analysis in the same environment and can further target both full-custom and ASIC designs in the unified environment.

Verifying the design of integrated circuits before fabrication is an important process, especially as integrated circuits become more complex and design cycles become increasingly short. Design verification includes many steps, a critical one being timing verification. For this purpose, static timing analysis tools such as PrimeTime from Synopsys are conventionally used to verify the timing of the chip by checking all the paths enumeratively or selectively without the need to provide test vectors at the primary inputs of the chip as required by dynamic simulation. However, the delay calculator built into the static timing analysis tool usually cannot be tuned into a full-blown timing simulator, and an additional simulator tool must be used. So traditionally, as shown in FIG. 1, static timing analysis and timing simulation are performed by two separate tools.

Another problem is that conventional integrated circuit designs can include both full-custom and application-specific integrated circuit (ASIC) portions. However, static timing analysis tools for ASIC designs normally cannot be used for full-custom designs that tend to be based on a transistor level. Accordingly, as further shown in FIG. 1, separate tools must be used to perform static timing analysis on the two separate design portions. It would be more desirable to have a common environment for both static timing analysis and timing simulation, as well as for verifying both ASIC and full-custom designs.

Currently available design tools have other shortcomings as well. In some conventional static timing analyzers, the path search is carried out from input to latch, latch to latch and latch to output to detect failing paths. It is well-known that the breadth first traversal (BFT) method, which searches paths forward to get the latest or the shortest time and then traces backward in depth first manner to get the slack, can run much faster than depth first traversal (DFT) or a depth first traversal with pruning method. However, there is a need in the art for a general BFT solution for circuits with, for example, level sensitive latches, as well as multi-phase and multi-frequency circuits.

Another problem is that during timing analysis, issues like false path and gates with simultaneously changing inputs cannot be ignored. Since the logic values for the side inputs of the gate along the failing paths are obtained from a pre-characterized timing library, these definite logic values (using unknown to Vdd or Gnd instead of definite Vdd or Gnd) and the rising or falling values at the input along the path can propagate as deep as possible. If a conflict occurs, then this is a false path. It may occur that the side input of a gate originally has the value unknown to Vdd or Gnd, then becomes rise or fall, similar to the input of the gate along the failing path, which dominates over unknown to Vdd or Gnd without conflict after function analysis. This is how simultaneously changing inputs occur. Normally, the gate with simultaneously changing inputs does not have pre-characterization results in the timing library, and so an in-circuit delay calculator must be used to evaluate the delay of this gate correctly.

Without filtering out the false paths, it is meaningless to calculate the maximum operating frequency of the circuit. Accordingly, it would be desirable if there were a method to solve the maximum operating frequency after filtering out the false paths. Each true failing path may consist of several segments including input to the first latch, latch to latch, and last latch to output. Each segment has its own timing constraint. This can be a formidable task to solve.

Another problem is that due to nanometer design, the issue of crosstalk has become increasingly important. In order to find the latest or shortest delay at victim's output, many runs of simulation for both driver and RLC parts need to be performed. It is very standard to generate reduced order modeling for the RLC part and couple it with drivers for simulation. Since the number of ports of a RLC network can be huge, the matrix of the reduced order modeling tends to be big and dense, causing degradation of performance. Therefore, it would be highly desirable to have a special algorithm to efficiently integrate the driver part in the time domain with the RLC part in frequency domain into a single simulation engine.

Another issue of crosstalk is the need to consider the correlation between aggressors and victim in order to get more accurate delay. Without considering the correlation between aggressors and victim, the aggressors are always assumed to switch in opposite direction to that of the victim and the switching times of the aggressors are found to fall in the timing window. The results for victim delays calculated this way are always too pessimistic. This problem can be further complicated due to the fact that there is a mixture of aggressors with groups of aggressors being correlated to the victim, correlated among the aggressors in the group, and totally uncorrelated to either aggressors or victim. Moreover, the victim delay can be a function of the switching times of aggressor which in turn are also affected by the victim delay, a chicken-and-egg type of problem. It would be desirable to have a general solution to resolve these difficult issues.

SUMMARY OF THE INVENTION

This invention provides a timing verification tool and method that can perform both static timing analysis and dynamic simulation, and for both ASIC and full-custom designs in a unified environment. The tool and method includes a delay calculator that partitions the overall design and includes functionality for automatically identifying circuit structures, e.g. complex gate, for timing characterization. The delay calculator further includes functionality for solving circuit structures at transistor level by incorporating function check.

According to another aspect, a timing verification tool according to the invention provides functionality for efficient path search for multi-phase, multi-frequency and multi-cycle circuit in the presence of level sensitive latch.

According to another aspect, a timing verification tool according to the invention provides functionality for carrying out functional check to filter out false path and identifying gate with simultaneously changing inputs.

According to another aspect, a timing verification tool according to the invention provides functionality for finding maximum operating frequency in the presence of level sensitive latches after filtering out false paths.

According to another aspect, a timing verification tool according to the invention provides a crosstalk solver that utilizes the admittance matrix and voltage transfer of an RLC part in the frequency domain coupled with the non-linear driver in the time domain implemented in a SPICE-like simulator.

According to another aspect, a timing verification tool according to the invention provides functionality for making use of the correlation between inputs of aggressors and victim to determine switching time at a victim's output iteratively.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

As set forth above, traditional static timing analysis tools with their own delay calculator, and traditional dynamic simulators which need to apply test vectors at inputs of the circuit, are two independent tools with different circuit representations and implementations.

Figure 1:
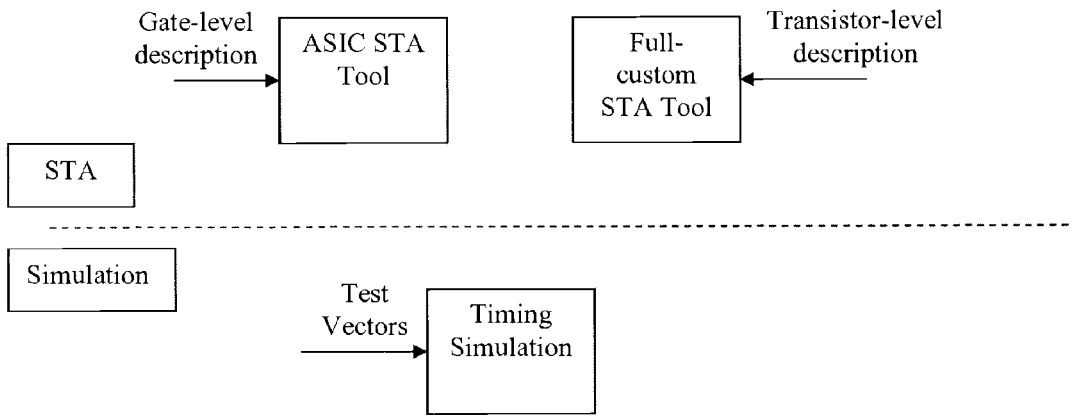
FIG. 1 is a block diagram illustrating conventional timing verification techniques.
Figure 2:
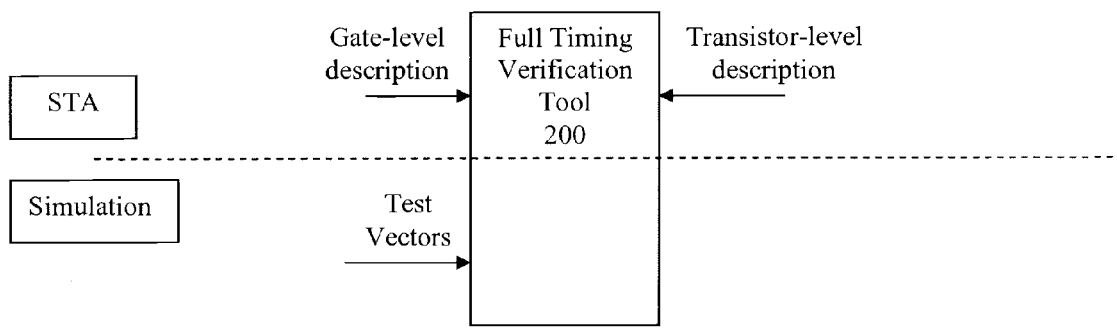
FIG. 2 is a block diagram illustrating timing verification techniques according to the present invention.

In stark contrast, as shown in FIG. 2, according to an aspect of the invention, these two tools are completely integrated into a single timing verification tool 200. According to another aspect, the tool includes a delay calculator that can be used both for timing analysis and for dynamic simulation, and is capable of analyzing the whole circuit by partitioning the circuit into stages prior to simulation. From a user's perspective, if they want to run timing simulation for the whole chip, they provide test vectors and/or assign waveforms as inputs. Then, the tool will pass the whole circuit to the built-in delay calculator which automatically partitions the circuit and starts running simulation. If they want to do static timing analysis, they provide the clock information and the tool starts doing path analysis and calculating delay associated with any cell using the delay calculator by passing the cell information to the delay calculator.

In one example implementation, timing verification tool 200 is a single executable file that can be executed independently as a standalone tool on a conventional computer or workstation. However, those skilled in the art will be able to implement the invention in various other alternative ways after being taught by the examples below. For example, certain or all aspects and features of the invention can be integrated into an existing environment or design flow such as Cadence Encounter, or in verification solution environments such as Synopsys PrimeTime or SPICE.

In a preferred implementation of tool 200 as a standalone tool, it receives a circuit to verify in the form of a SPICE netlist. As is known, a SPICE netlist is a hierarchical file that can contain descriptions of various portions of an overall integrated circuit including custom design blocks, standard cells, RLC parts and interconnects. A SPICE netlist can further include clock descriptions and other waveform descriptions that can serve as test vectors for simulation, as well as timing constraints for timing analysis. Those skilled in the art will appreciate that there are many equivalent forms of circuit representations and timing constraint inputs that can be substituted for and/or provided in addition to a SPICE netlist and so the invention is not limited to this specific implementation.

Figure 3:
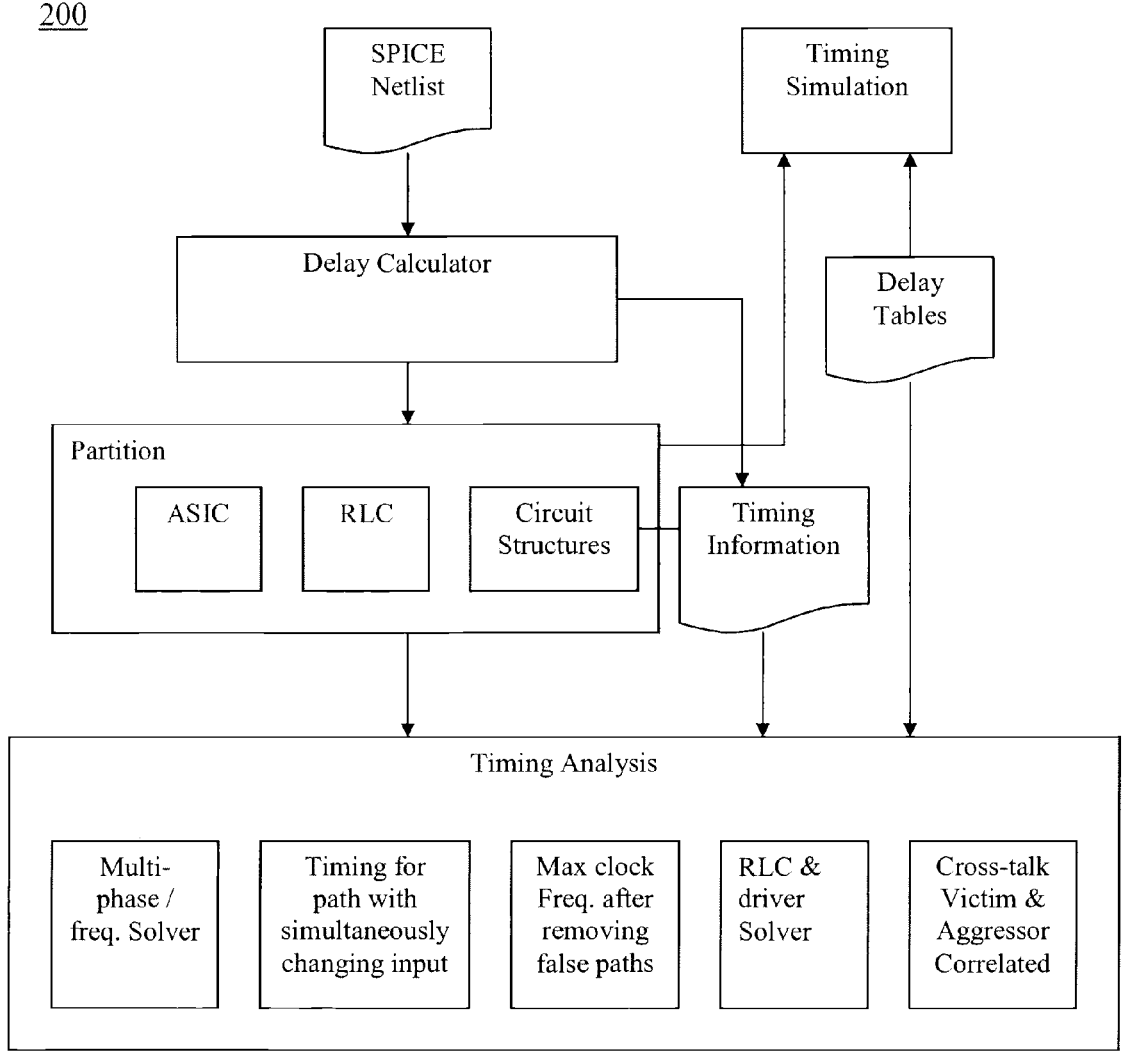
FIG. 3 is a block diagram illustrating an example implementation of a timing verification tool according to the invention.

An example implementation of tool 200 is shown in FIG. 3. As shown in FIG. 3, the tool 200 includes a delay calculator that partitions the circuit from the SPICE netlist into various components as will be described in more detail below. The delay calculator decomposes transistor-level circuit structures and determines timing information for them. Tool 200 further includes both a timing analysis module and a timing simulation module. Although it is possible for conventional techniques to be used to perform timing analysis and timing simulation based on the information provided by the delay calculator of the invention, the tool 200 further includes solvers for various timing verification problems as illustrated in FIG. 3 and as will be described in more detail below.

As mentioned above, according to one aspect, the timing verification tool 200 includes a delay calculator that partitions the circuit for both timing analysis and timing simulation, and further decomposes transistor-level structures and determines timing information from them A method implemented by the delay calculator according to one preferred embodiment will now be described in more detail in connection with the flowchart shown in FIG. 4.

Figure 4:
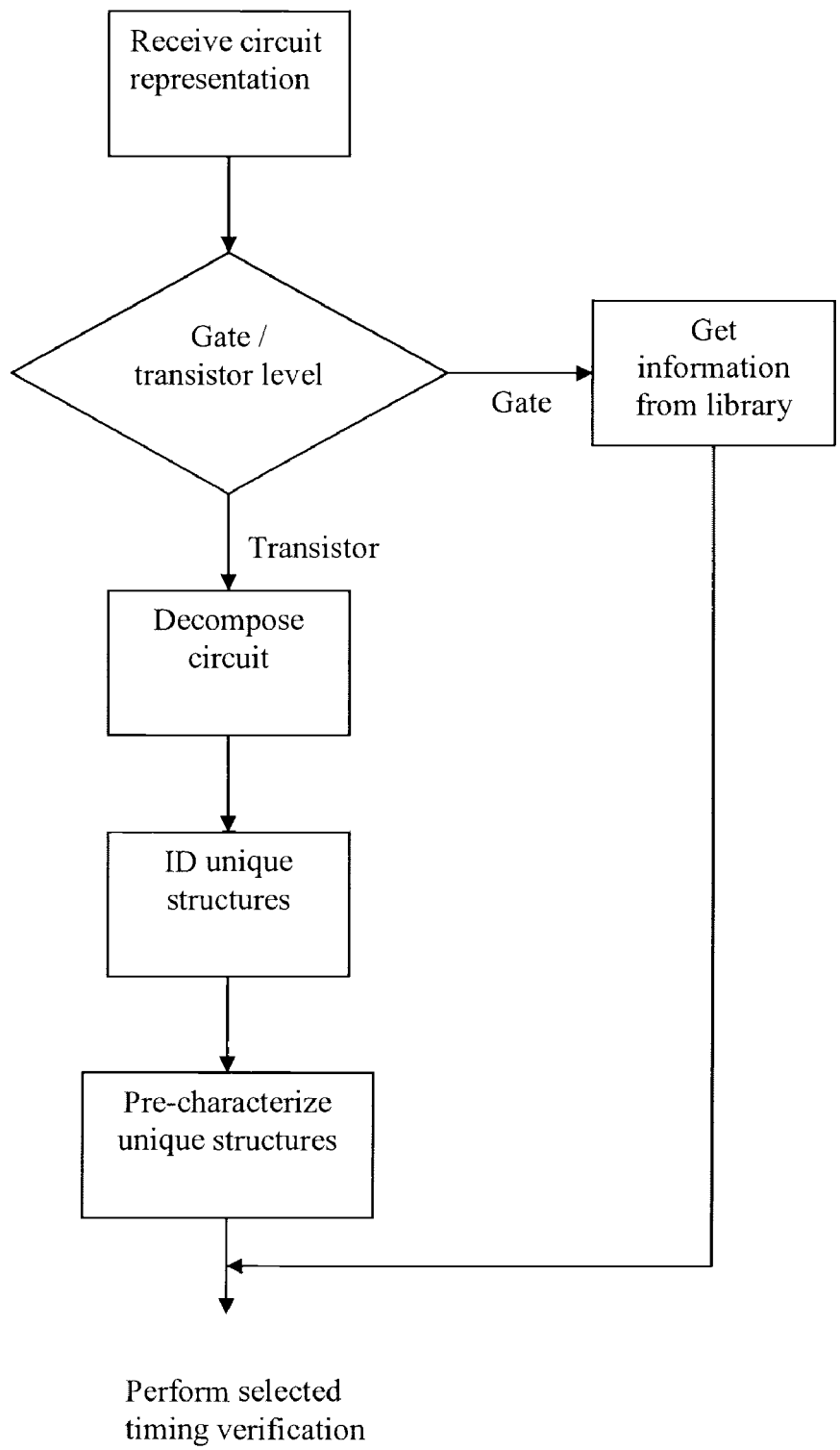
FIG. 4 is a flowchart illustrating an example method for providing timing verification for both gate-level and transistor-level designs according to the present invention.

As shown in FIG. 4, timing information and/or delay tables for portions of a circuit that have gate level representations are obtained from a library, e.g. a standard lib file, while circuit portions with a transistor level representation are processed to obtain the needed timing information. It should be noted that tool 200 itself can further include functionality for generating delay tables for gate level representations according to well-known techniques.

Referring back to FIG. 4, for the circuit portions having transistor level representations, the delay calculator performs additional processing. In a first step, these portions are decomposed into various components including driver-load gate, transfer gate, RLC part and stage etc. Here, stage refers to channel connected transistors which in some cases can be reduced further to driver-load gate, transfer gate and RLC part. By doing this decomposition, the circuit representation can be simplified, thus facilitating the search of patterns and timing analysis at gate level as will be described in more detail below.

Figure 5:
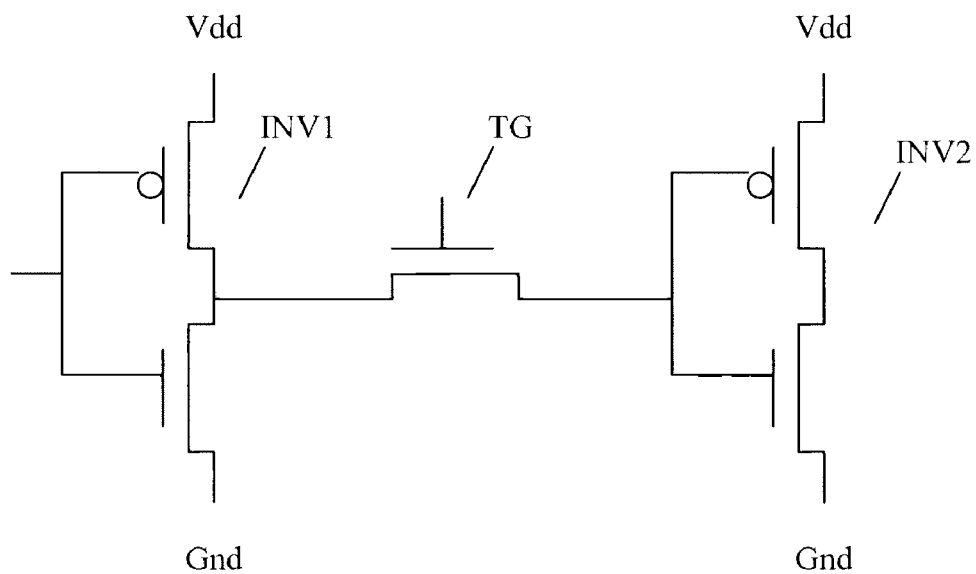
FIG. 5 illustrates an example circuit for illustrating certain timing analysis techniques according to the present invention.

A driver-load gate is found by doing a depth first traversal search from Gnd to Vdd. If the path reaches the gate of a transistor, then back up and keep searching until Vdd is found. For example, in the circuit shown in FIG. 5A, instead of treating both the inverter (i.e. driver-load gate) and the nmos transfer gate TG at the center of FIG. 5A as a single stage completely at the transistor level, the identities for inverters INV1 and INV2 and nmos transfer gate TG are preserved.

Other structures such as ASIC and RLC parts can be identified by well-known techniques. For example, in a SPICE netlist, RLC parts are self-identified. Preferably, however, the delay calculator further identifies and preserves the input and output ports for such parts.

Returning to FIG. 4, in a next step, unique structures are identified for pre-characterization. In one example implementation of the invention, in order to expedite the identification of unique driver-load structures, a tree structure method is first used to obtain and store the topology for all decomposed structures. This methodology will now be described in more detail in connection with FIGS. 6A to 6C.

Figure 6C:
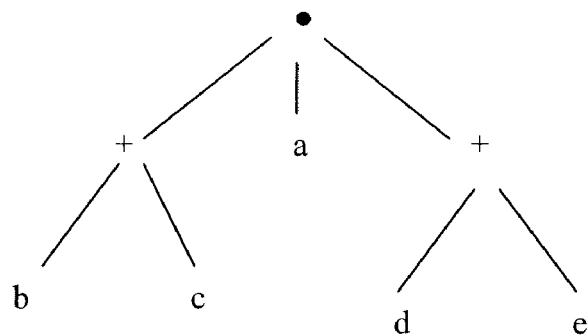
FIGS. 6A to 6C illustrate examples of how tree structures are formed for characterizing driver-load structures.
Figure 6A:
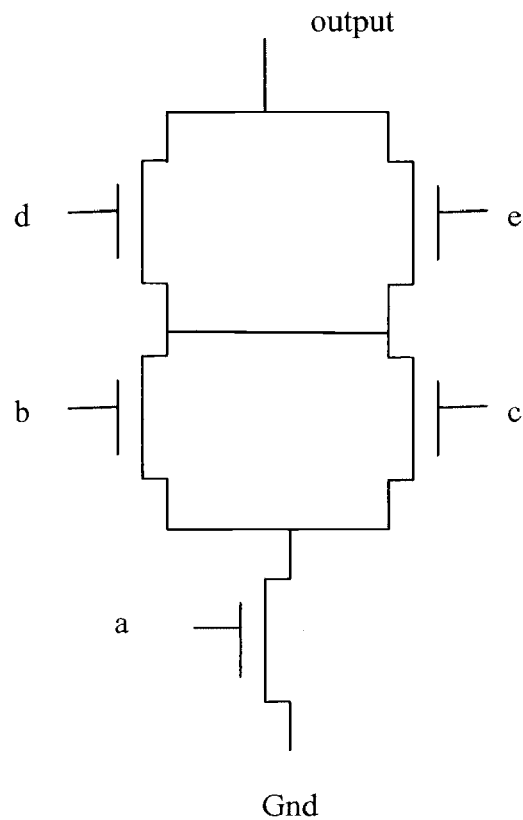
Figure 6B:
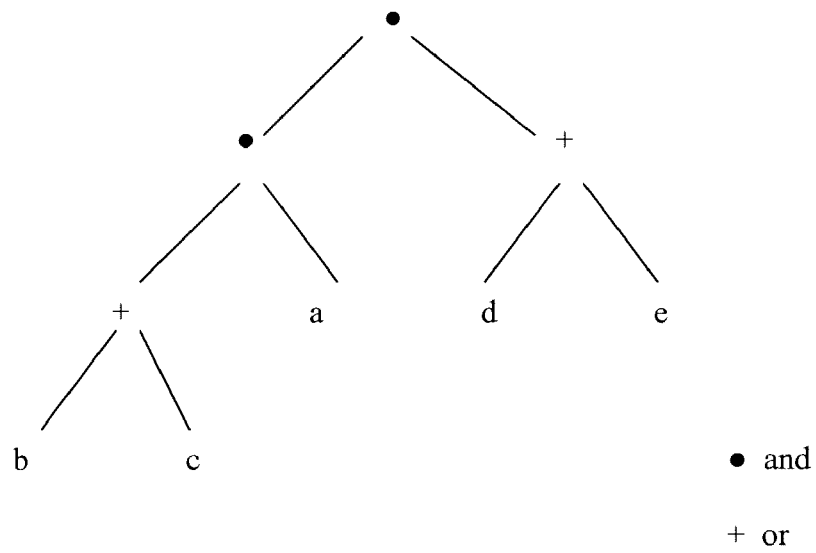

FIG. 6A shows an example of a driver-load gate structure that has been identified during decomposition. FIG. 6A shows an n-channel structure, but p-channel can be done in the same way. FIG. 6B shows the topology of the structure in FIG. 6A, which is derived using techniques understood by those skilled in the art. For example, the signal flow of each transistor in the structure is determined, and then each is joined together in a tree according to their connections and relationships between their signal flows. For example, transistors b and c have two ends tied together with the same signal direction and so are joined in parallel (i.e. logical "or" or "+"). The same analysis applies to transistors d and e. The aforementioned collapsed edges then collapse with transistor a in series (i.e. logical "and" or "·"), since they have the same signal direction.

The leaf elements in FIG. 6B are the corresponding nfets in FIG. 6A which are connected with nfets or groups of nfets either in series denoted by "·" or in parallel denoted by "+". FIG. 6C is the simplest form of the tree after collapsing two series "·" nodes. However, the present invention recognizes that when several groups are in series, the ordering of these groups is crucial. Therefore, one of the attributes of the parent node is to store the information about which child is closest to the voltage source. For example, the top node "·" has three children, namely "+", "a," and "+", In a data structure, the ordering of the three children is stored, which are, for example, 1, 2 and 0 for "a," the rightmost node "+" and the leftmost node "+," respectively. This information indicates which transistor is closest to a voltage source, and is preferably used in delay calculation.

Once topology information is obtained for all decomposed parts of the circuit, they are compared with each other to identify the set of unique structures in the circuit. There can be many ways to compare whether two structures are the same, not just topologically, but also comparing the corresponding transistors to determine whether they have the same length, width etc. One preferred method according to the invention is to compare trees starting from the highest level node, which is the output, all the way to the lowest level node which refers to the leaf element. Initially, a key can be stored for any structure using a certain criterion. For example, a number is assigned for each node depending on whether it is a parallel or series node, and its level number, and multiplied by the number of children, and these numbers are added together for each node to get the key. By comparing just the keys of the structures, non-equivalent structures can be immediately singled out without traversing the tree.

For trees having the same key, they are compared by searching from the top level node recursively using a depth first traversal (DFS) method. If a node has attribute "·", then its children are checked in a definite order, as preserved in the step above. If a node has a "+" attribute, then for all configurations of its children, each configuration is checked one by one until a match is found. Ordering of children need not be considered if their parent node has a "+" attribute. For each configuration the children are searched iteratively until a match is found at the end. If a topology match is found, then check all transistors associated with the leaf node to see if all of them match in terms of length, width etc. If so, then a complete match of the two structures is found, resulting in one unique structure.

Returning to FIG. 4, a next step is to pre-characterize timing for the unique structures. The conventional approach is to search a path from the triggered transistor to both voltage source and the output of the structure. The users in some cases need to supply some node voltages prior to calculation. In one example implementation, the algorithm used in this invention places particular emphasis on function check to solve any kind of structure at transistor level, not just limited to driver-load gate. Moreover, the algorithm provides an explicit function check after the path is found, reducing the need for a user's input as much as possible and generating correct input voltages. The single output structure is pre-characterized to store the delay and slope at output as function of input slope and output loading. The function information for each path of input and output pair is stored. For multiple output cells, the pre-characterization is done and stored for several input slopes and their delays, instead of the delay and slope at output as a function of input slope and output loading.

One example algorithm for performing pre-characterization of a transistor-level structure will now be described in connection with the flowchart in FIG. 7.

Figure 8:
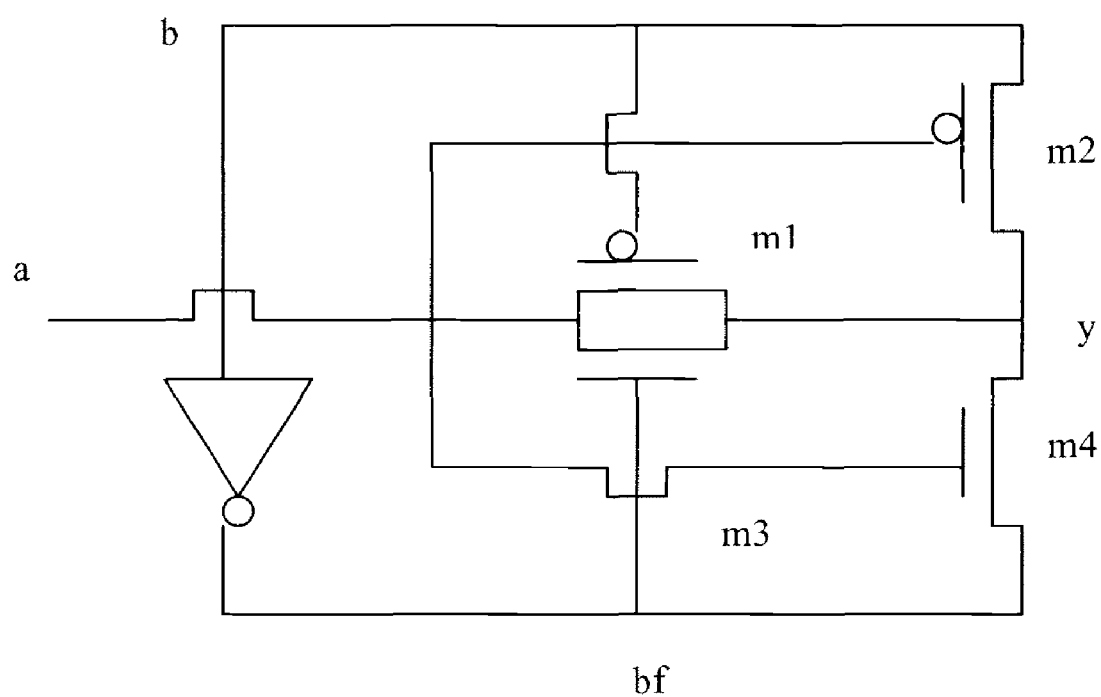
FIG. 8 is an example circuit for illustrating an algorithm for solving a circuit structure according to the present invention.

As shown in FIG. 8, a first step is to identify a complete path in the structure from one triggered input to output. This path follows the signal flow of a triggered transistor and generally includes two parts: one is from the triggered transistor to Vdd or Gnd in a direction opposite the signal flow of the transistor, and the other from the transistor to output following the signal flow. If the transistor does not have a definite signal flow direction, and/or is bi-directional, then two cases are considered: (1) from the source of the transistor to Vdd or Gnd, and from the drain of the transistor to output and (2) from the source of the transistor to output, and from the drain of the transistor to Vdd or Gnd. If the path reaches the gate of a transistor which belongs to the same structure, follow the above-described procedure to search a path to either Vdd or Gnd and to output from this newly triggered transistor until the output is reached.

Figure 7:
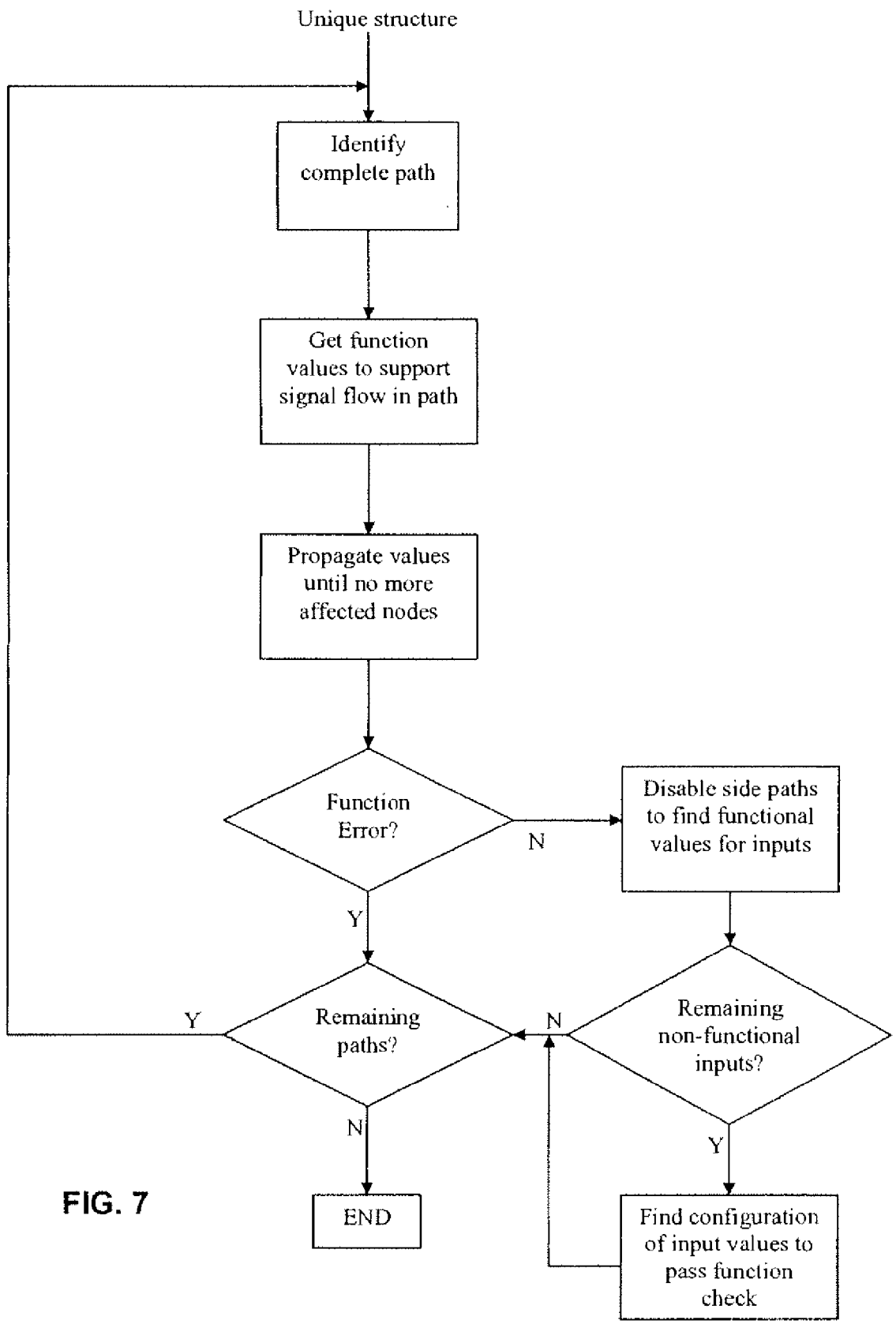
FIG. 7 is a flowchart illustrating an example method of characterizing a circuit structure to obtain timing information useful for verification according to the invention.

As shown in FIG. 7, in a next step, do function checking for the obtained path and get the function values for all nodes of the structure that support signal flow along this path. Assign a triggered node along the path to be either rise or fall depending on whether the said node is along Vdd or Gnd path. The gate for a non-triggered transistor along the path is assigned the value to turn on the transistor, e.g. Vdd for nfet, and Gnd for pfet.

In a next step shown in FIG. 7, these values are propagated as far as possible until no more affected nodes can be found. Preferably, x2Vdd (unknown to Vdd), x2Gnd,Gnd2x,Vdd2x and definite values like Vdd, Gnd, rise, and fall etc. are used for the affected node values which are propagated to find more affected node values. For example, if the gate node of an nmos transistor has affected node value rise, and one end of the nmos transistor has Vdd, and the other end (e.g. a drain node) doesn't have any affected value yet, then that end will become x2Vdd instead of the definite value rise. Then from this drain node with newly assigned affected node value x2Vdd, its adjacent nodes will be checked to find more affected node values. In another example, a gate node of an nmos transistor has value rise, and if the source of this nmos has been updated to have a rise value, then the drain should become x2Vdd. If this drain node originally has Gnd2x and now has new affected value x2Vdd, this node should now be considered to be rising.

Next, if function check has been carried out and there is no function error, then make sure all input node have affected values. If some still have unaffected node values, disable the side paths by requiring the appropriate node values, e.g. nmos has Vdd and pmos has Gnd at the gate. Check one by one, and if function check fails, flip-flop the value and keep checking until one configuration of functional values is found.

As further shown in FIG. 7, if some inputs still have no affected values, then check all configurations and once one configuration and function check is passed, then stop and use all the input values for this input and output pair. Check if this input/output pair has already been obtained. If so, skip this one. Pass this information for delay calculation and store the function values for this input and output pair.

As shown in FIG. 7, the same steps as described above are repeated until all paths in the structure have been exhausted.

An example structure for illustrating the above pre-characterization algorithm is shown in FIG. 8. Take node b for example. Node b has three fanouts, pfets m1, m2 and inverter inv1. If node b is triggered, then the three paths through the three fanouts need to be checked one by one. Suppose b falls (the case for b rising follows a similar discussion and is omitted here), the path from a through m1 to y (output) exists. Node a can have two choices, Vdd and Gnd. First choose node a to be Vdd, which means y is rising if the path exists. There is an inverter inv1 between node b and bf. In checking the pfet inside inv1, since b falls, bf becomes X2Vdd. Likewise, in checking the nfet inside this inverter, bf turns out to be Gnd2X. By combining X2Vdd and Gnd2X, bf has the value rise. Then, since m4 is on, and bf is rise, y should have a value rise which doesn't conflict with rise value for y which is already obtained. Accordingly, the input/output pair for b falling is y=rise, and a=Vdd. Still sticking to the first path from b to y through m1, now assign the value Gnd for node a. By the same argument, we get another input/output pair for b falling of y=fall and a=Gnd without any functional error.

Now consider the second path from b to y through m2 with node b falling similar to the first path. In this case, node a must be Gnd in order to support this path from b to y through m2. By performing function check the same way as above, there is no function error, and an input/output pair for b falling is y=fall, and a=Gnd. However, this is exactly the same as the second case of the first path as discussed before. So the input/output pair due to this second path is discarded. By the same token the third path from b to bf also generates an input/output configuration already addressed before and can be deleted. It is straightforward to discuss the case when node a is triggered in a similar way. In this example, there will be eight total input/output configurations: (1) a=rise, b=Vdd, y=fall; (2) a=rise, b=Gnd, y=rise; (3) a=fall, b=Vdd, y=fall; (4) a=fall, b=Gnd, y=rise; (5) a=Vdd, b=rise, y=rise; (6) a=Vdd, b=fall, y=fall; (7) a=Gnd, b=rise, y=rise; and (8) a=Gnd, b=fall, y=rise. Accordingly, for each input rise or fall, the output can have both rise and fall depending on the value of the second input.

Figure 9:
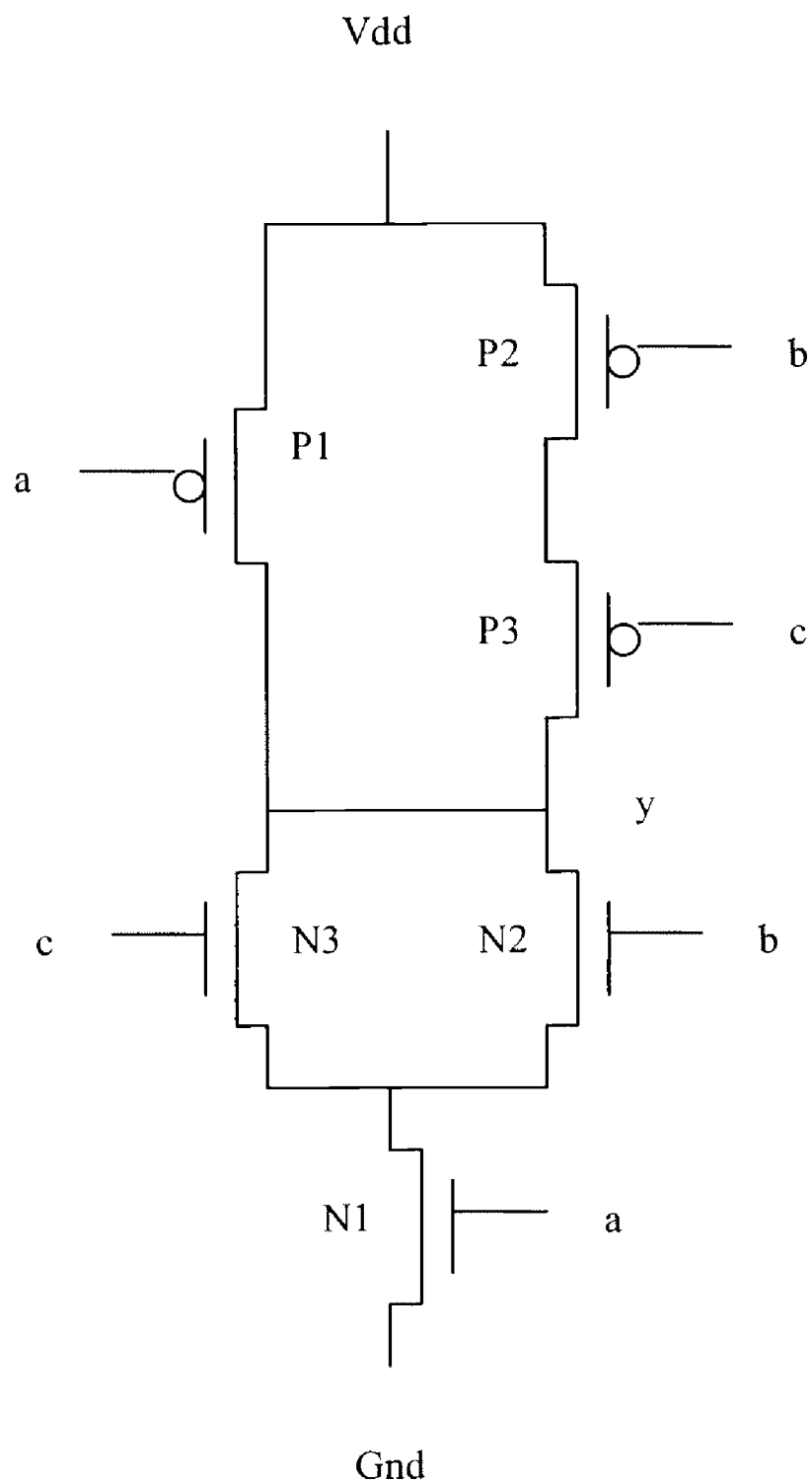
FIG. 9 is another example circuit for illustrating an algorithm for solving a circuit structure according to the present invention.

Another example of a 3-input CMOS gate shown in FIG. 9 is used to demonstrate how functional check is performed at a transistor level according to one example implementation of the invention. Suppose node a falls, then node y is expected to rise due to the path from Vdd to output y. This yields definite node values fall and rise for nodes y and a. However, this fact alone is not enough to infer the node values for nodes b and c. The side paths should be disabled. There are three side paths, the first one from node y through P3 and P2 to Vdd, the second path from node y through N2 to Gnd, and the third one from node y through N3 to Gnd. Obviously N2, N3 and P3 adjacent to the node y cannot be off simultaneously. If we choose N2 off or b having value Gnd, then N3 cannot be off (Gnd for node c), since the fact that both b and c are set to Gnd causes both P2 and P3 to be on and leads to node value Vdd for node y, contrary to the rise value expected for node y. By adopting the preferred method of functional check at transistor level for this example, the conclusion is that when node a falls, there can be two delay values for node y rising due to either b set to Vdd and c set to Gnd or b set to Gnd and c set to Vdd.

Returning to FIG. 4, at this point, all information needed for standard STA or simulation is at hand. Conventional tools for performing either STA or simulation can be used with this information. However, improved timing analysis and verification can be obtained using additional techniques of the invention as will be described in more detail below.

According to one aspect, and as illustrated in FIG. 3, a timing verification tool 200 according to the invention includes a new methodology to solve the timing analysis problem for multi-phase, multi-frequency and multi-cycle circuits in the presence of level sensitive latches. This methodology will now be described in more detail.

Due to the presence of level sensitive latches, the path passing through several latches tends to be very long, thus a conventional method like depth first traversal (DFS) or depth first traversal with pruning can potentially become cpu intensive. Breadth first traversal method is the most efficient. However, storing the latest arrival time (LAT) at each node can be a challenging problem. For a multi-clock phase circuit, even when doing phase by phase to store LAT with respect to one phase with minimal memory overhead, the path still may propagate through a level sensitive latch in mid-phase controlled by a different clock phase, thus causing confusion in assigning LAT.

According to one example implementation, the present invention adopts the following method which is described in more detail in connection with the flowchart in FIG. 10 and the circuit in FIG. 11.

Figure 10:
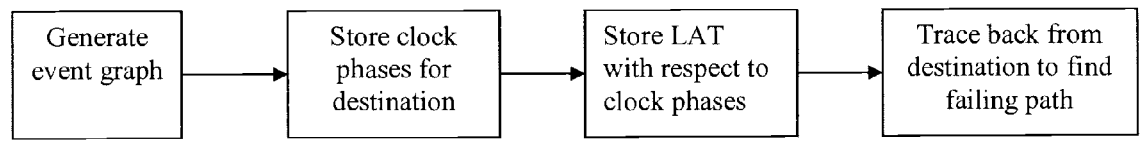
FIG. 10 is a flowchart illustrating an example method for handling the timing analysis problem for multi-phase, multi-frequency and multi-cycle circuit in the presence of level sensitive latches.
Figure 11:
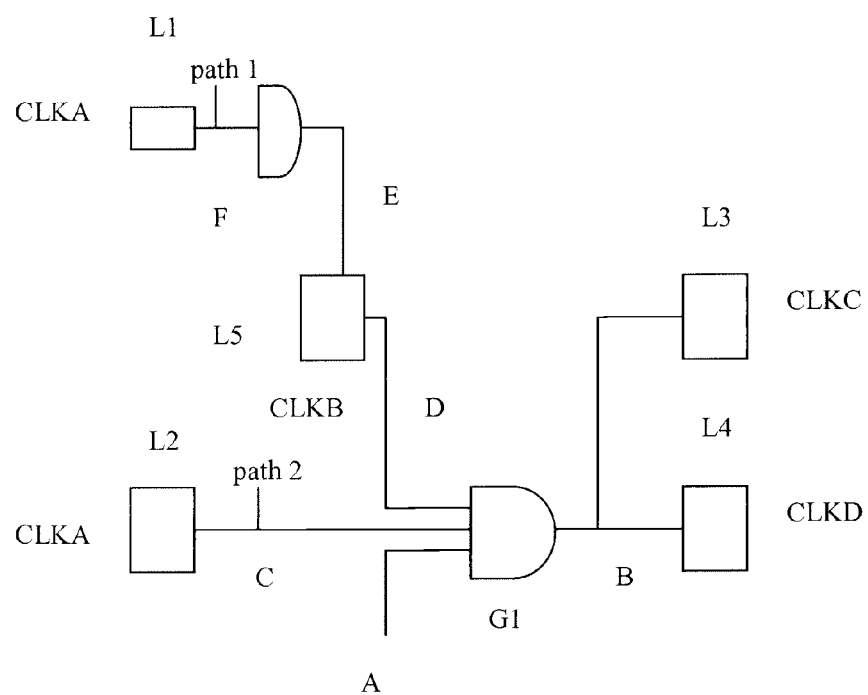
FIG. 11 is an example circuit for illustrating a preferred method for handling the timing analysis problem for multi-phase, multi-frequency and multi-cycle circuit in the presence of level sensitive latches.

As shown in FIG. 10, the first step is to generate an event graph that lists the nodes in a signal path through which signals may pass. FIG. 11 shows two source edge-triggered flip-flops L1 and L2, one level sensitive latch L5 and two destination edge-triggered flip-flops L3 and L4. It is clear that node A does not belong to an event graph. Without information for node A, LAT for node B can never be obtained since LAT for all of the inputs A, D, and C should be known beforehand. However, during the path tracing process, node A can never be reached. As a result, the fact that node A has no LAT invalidates the LAT information for output node B. So node A should be deleted from the event graph. In one example implementation, the event graph is obtained by carrying out a DFS starting from the specified inputs, through the outputs of memory elements including edge-triggered flip-flops and level sensitive latches, and stopping at the inputs of the memory elements or specified outputs.

As shown in FIG. 10, the next step is to store clock phases for the destination latch or flip-flop. The procedure above can be used to obtain the event graph. Referring to the example in FIG. 11, a DFT is performed from the output of any latch or flip-flop, for example the DFT search is started from the output of L1. When the input node E of L5 is accessed, record the information about destination latch L5 at node E and back up to F and store the same latch information into node F as that of node E. Then search forward from D which is output of L5 and arrive at node B with two fanouts L3 and L4, store the information of the two destination latches L3 and L4 information into node B, then back up to D and record the same as that in node B. Finally, start from C which is the output of L2. Since the output node B for gate G1 has already been accessed, there is no reason to search again beyond node B. Then simply copy the information at output node B into the input node C of G1 and stop the procedure for this example.

It should be noted that the same objective can be achieved by using a different procedure. Once the event graph is obtained, search backward from all latches or flip-flops within the event graph and record the latch information in every node being accessed.

Figure 12:
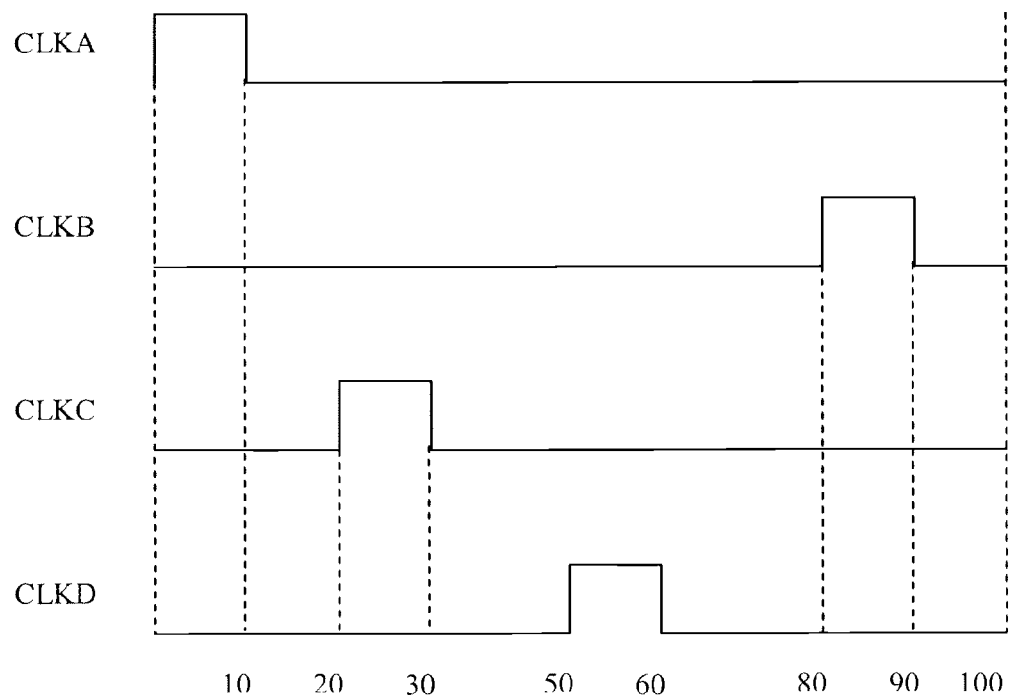
FIG. 12 is a timing diagram further illustrating timing analyses performed in connection with the circuit in FIG. 11.

The next step, as shown in FIG. 10, is to store LAT with respect to clock phases. One possible set of clock phases are shown in FIG. 12 (for example, as obtained or derived from the SPICE netlist), assuming sources L1 and L2 and destinations L3 and L4 are positive edge-triggered flip-flops and the L5 in the middle of the circuit is a positive level sensitive latch. The signals coming from L1 and L2 along paths numbers 1 and 2 are triggered by the same clock phase CLKA. Therefore, LAT for the nodes along these paths initially are recorded with respect to the positive triggering edge of CLKA. When the latched signal from L1 reaches L5 in mid-phase of clock CLKB controlling latch L5 and passes through L5, then LAT stored at node D must be with respect to positive edge of CLKB. Suppose, for example, the latched signal from L1 through D (output of L5) to node B has total path delay 145 (for example, as obtained from stored or computed timing information for the structures). Then based on FIG. 12, LAT at B with respect to CLKB becomes 65 (145−80=65). Suppose also that, for the latched signal from L2 to B, the total path delay is 10. Still, 10 with respect to CLKA is stored at node B. This is why at node B there can be two LAT, one is 10 with respect to CLKA due to path 2 and the other is 65 with respect to CLKB due to path 1.

Conceptually, it is possible to figure out which path is more critical and store LAT for the most critical path. If not, then LAT must be stored for all clock phases. The following relation is preferably used to decide which LAT should be stored.

$Q(x,\text{node},y) = \text{TimingConstraint}(x,y) - \text{LAT}(\text{node},y);$ TimingConstraint(x,y)=timing constraint between source clock phase y and destination clock phase x;

LAT(node, y)=LAT at node with respect to clock phase y;

For path 1 passing through L5, D and B, the two Q values are $Q(L3,B,L5) = 40 - 65 = -25;$ $Q(L4,B,L5) = 70 - 65 = 5;$ Note that, referring back to FIG. 11, latches may be used for the first and the third arguments of function Q which actually refer to the clock phases controlling the given latches. Here in Q(L3,B,L5) the controlling clock phases for L3 and L5 are CLKC and CLKB, respectively. LAT 65 at node B for path 1 is from L5 controlled by CLKB. In FIG. 12, CLKC is before CLKA. So the destination latch L3 should be controlled by CLKC in the next clock cycle not shown in FIG. 12, and the timing constraint for path between L5 and L3 is 20+100−80=40. By the same token $Q(L4,B,L5) = 50 + 100 - 80 - 65 = 5.$ For path 2 from L2 to C and B, the two Q values are $Q(L3,B,L2) = 20 - 10 = 10;$ $Q(L4,B,L2) = 50 - 10 = 40;$ Note that both of these two Q values of path 1 are less than those of path 2. Thus, path 1 is more critical than path 2 and we store LAT 65 for path 1 with respect to CLKB controlling L5.

Figure 13:
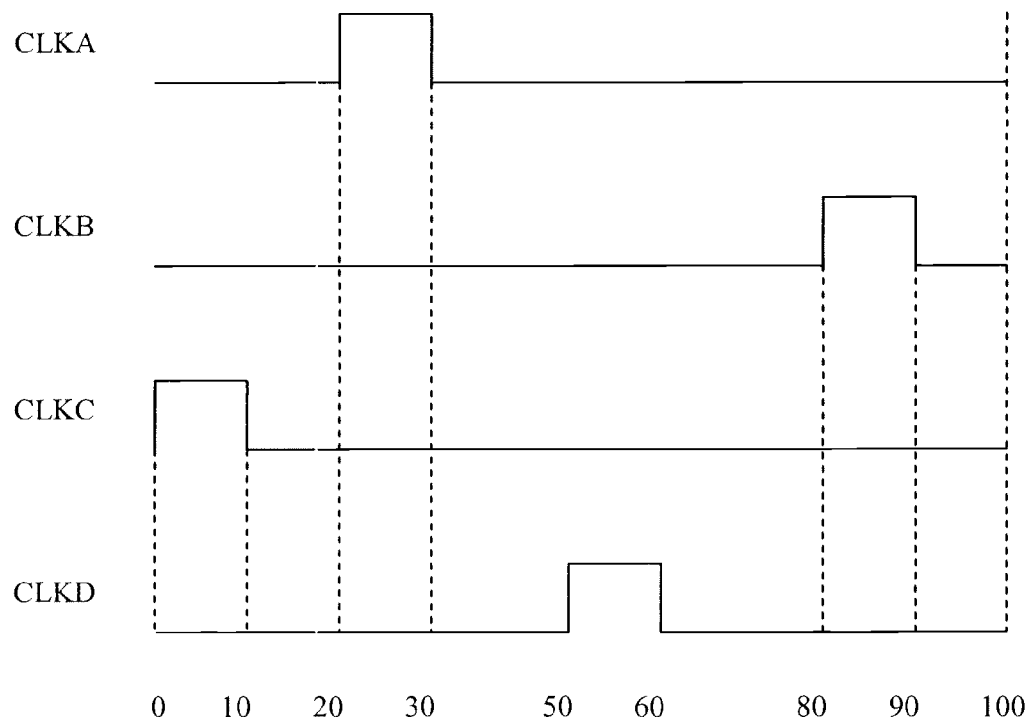
FIG. 13 is a timing diagram illustrating analyzing paths with respect to different clock phases according to an aspect of the invention.

In some cases, it is not possible to determine which path is more critical than the other, and so it is preferable to store LAT for all of these paths with respect to different clock phases. This can be illustrated by FIG. 13 showing a different set of clock phases. Here, LAT at node B are 40 and 25 with respect to CLKA and CLKB, respectively, similar to the previous example. For path 1 passing through L5, D and B, the two Q values are $Q(L3,B,L5)=20-25=-5;$ $Q(L4,B,L5)=70-25=45;$ For path 2 from L2 to C and B, the two Q values are $Q(L3,B,L2)=80-40=40;$ $Q(L4,B,L2)=30-40=-10;$ This means that we can not tell which path up to the node B is more critical. Thus, we need to store both LAT at node B with respect to CLKA and CLKB, respectively.

It should be further noted that this formalism can apply to the case of a multi-frequency circuit for which the timing constraint is determined in the same way as that of multi-phase circuit. In the multi-cycle case, the timing constraint is hard to obtain, since even for paths with source and destination latches controlled by the same pair of clocks, the tool is not able to decide which path should be a multi-cycle one. One solution is for the user to specify the pair of latches with a multi-cycle timing constraint. Then at each node the program records the source and destination latches information if either source or destination latch is specified by the user as multi-cycle path. If this pair of source and destination happens to be specified by the user, then a multi-cycle timing constraint is used.

Returning to FIG. 10, the next step is to trace back from destination point to find failing path. From LAT at the input of latches, the slack can be determined as described below. Negative slack means that there are failing paths reaching the input of the memory element, but the failing paths are not yet known. It is only necessary to trace back from the input with negative slack to find the failing paths.

Refer back to FIGS. 11 and 12, for example. First calculate the slack at node B. LAT 65 with respect to CLKB and clock phases CLKC and CLKD for driven latches L3 and L4 are stored in node B. Therefore, for the most critical path reaching L3, the timing constraint is 40 and slack for this path is 40−65=−25. For the path stopping at L4 the timing constraint is 70 and slack is 70−65=5>0. So use DFT to search back from node B with a negative slack with CLKC as the clock phase for the destination latch. Assuming delays from D to B and from C to B are 1, LAT at C is 9 from the positive edge of CLKA and LAT at D is 64 from the positive edge of CLKB. Next examine the two inputs D and C consecutively. For C, it must be determined what the slack is for the path from C through B to L3 controlled by CLKC. This is obtained by the following formula.

$slack(C)=slack(B)+Q_{C->B}(L3)-Q(L3,B,L5)$ $Q_{C->B}(L3)=Q(L3,C,L2)-Delay_{C->B}$ $Q(L3,C,L2)=TimingConstraint(L3,L2)-LAT(C,CLKA)$ $Q(L3,B,L5)=TimingConstraint(L3,L5)-LAT(B,CLKB)$ Q(L3,B,L5) can be understood as follows. At node B LAT is for the most critical path from a memory element L5 controlled by CLKB. If this path reaches L3 controlled by CLKC, then the timing constraint for that path is denoted by TimingConstraint (L3, L5). The slack of this path at node B is denoted by Q(L3,B,L5). Q(L3,C,L2) is defined similarly. TimingConstraint (L3, L2) is known because LAT at node C is from L2 controlled by CLKA. By plugging in the numbers, slack(C)=−25+10−(−25)=10.

This means that the path passing from C to B cannot be a failing path. Therefore, trace back from C should be terminated. Next, go to another input D. At D LAT is 64 with respect to clock CLKB. LAT recorded at B is 65 with respect to CLKB and slack is −25 for L3. Since both nodes D and B store LAT from the same clock phase CLKB, the slack at D can be figured out using the following formula, $slack(D)=slack(B)+(LAT(B,CLKB)-LAT(D,CLKB)-delay(B->D));$ This yields slack(D)=−20. This implies that the path passing through D and B is a failing path. Thus, keep searching backward from D until a flip-flop is reached. Note that when latch L5 is reached, the search is not stopped there, but the tracing continues back if the slack at the input of the latch is negative. In other words, the search treats a latch as a gate. Once a flip-flop is reached, the search for that failing path is done. Then continue this DFT from other nodes with negative slack in searching backward until all failing paths are found.

According to one aspect, and as shown in FIG. 3, a timing verification tool 200 according to the invention further includes a methodology for performing function check and detection of gates with simultaneously changing inputs. There may be several possible causes for gate inputs to be simultaneously changing. One case can be detected through false path detection. When a path at gate level is exercised, the inputs of gates along the path have logic values either rise or fall. The side inputs should have the value to support the propagation, e.g. Vdd for n and gate and Gnd for nor. The function values of the side input can be directly obtained from the pre-characterized timing library.

In one example of the invention, definite values such as Vdd or Gnd are not used; rather, values unknown to Vdd or Gnd are used. Where these initial known values are propagated from the input and the side input, a side input may have both values unknown to Vdd and rise. Then the value rise dominates over the value of unknown to Vdd which may occur at the side input of a gate along the path. This is how the simultaneously changing inputs are detected. The timing of the gate with simultaneously changing inputs usually is not pre-characterized. Thus, the in-circuit delay calculator must be used to calculate its delay accurately.

Figure 14:
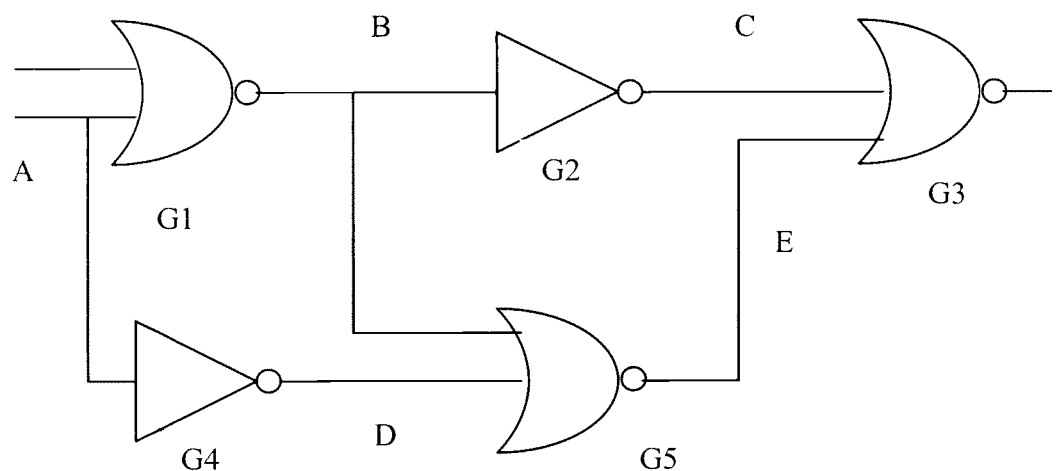
FIG. 14 is an example circuit for illustrating a preferred algorithm to perform function check and detection of gate with simultaneously changing inputs in accordance with the invention.

FIG. 14 is an example circuit for illustrating certain aspects of this methodology, In a first step, the failing path is obtained which passes through blocks such as gates, stages etc., and the functional relationship for the inputs are recorded. For example, the circuit of FIG. 12 includes a failing path passing through nodes A, B and C and gates G1, G2, and G3 which must have node value either rise or fall. In order to verify the functional correctness of this path, the switching values of the nodes along the path and the values for the side inputs to support the path to the rest of the circuit should be propagated as far as possible. If there is no function conflict being uncovered, then this failing path is considered as a true failing path, otherwise this path is a false path. The importance of using unknown to Gnd or Vdd for the side inputs instead of definite Gnd or Vdd value in function check will become apparent. Assume that A, B, and C have values rise, fall, and rise, respectively. The side input E must have a value Gnd to unknown instead of using a definite value Gnd for this nor gate. When propagating A to D through an inverter G4, D must have the value fall. Then, propagate D to the nor gate G5 with B as the second input. Since both B and D are simultaneously falling inputs of the nor gate G5, its output E must be rise. Nodes C and E drive the nor gate G3 which is along the failing path. This explains the procedure for detecting a gate with simultaneously changing inputs. If starting with a definite value Gnd for node E, there may arise a conflict, since E will turn out to be rise.

According to one aspect, and as illustrated in FIG. 3, a timing verification tool 200 according to the invention further includes a methodology for solving the maximum operating frequency of the circuit after the false paths have been deleted. The timing constraints for a failing path passing through several level sensitive latches can be complicated. This can be formulated as a complex linear programming problem with the clock period as the objective function. The present invention instead provides a heuristic method that uses a binary search for each path which contains several segments to find its minimum period. Then, the minimum of all the periods obtained from each path consecutively is selected. This methodology will now be described in more detail.

Figure 15:
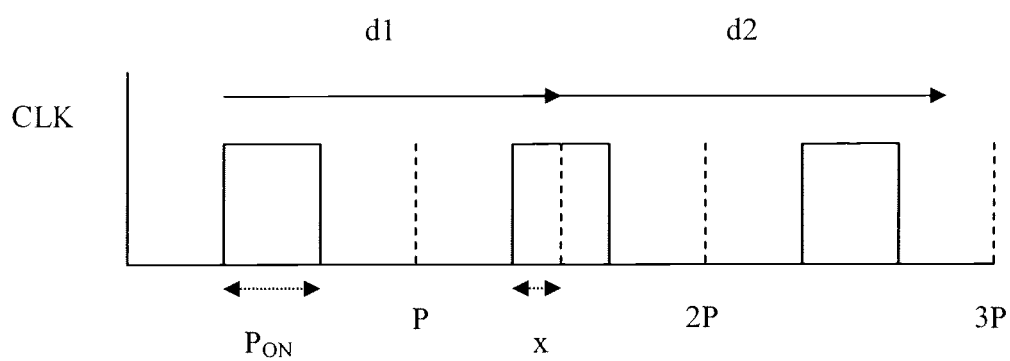
FIG. 15 is a diagram for illustrating timing constraints encountered when attempting to solve the maximum operating frequency of the circuit after the false paths have been deleted.

As mentioned above, determining the timing constraints for an overall circuit can be tedious due to numerous failing paths, each of which may consist of several segments with their own timing constraints. This concept is illustrated by a simple case shown in FIG. 15 with one failing path which includes a first segment from latch 1 to latch 2 with delay d1 and a second segment from latch 2 to latch 3 with delay d2. Assuming a single clock phase, each latch is controlled by the same clock phase separated by one clock period P for each. The timing constraint for this path with two segments can be written down as follows, $$d1<(P+P_{on})$$

$$(x+d2)<(P+P_{on})$$

$$x=\max(d1-P,0)$$

objective function is to minimize P

Here x measured from the opening edge is the transition point where the signal coming from latch 1 arrives in midphase of latch 2. If the signal arrives at latch 2 prior to its opening edge, then x is 0. The ordering of each of the above equations is crucial, since the second one depends on the transition point x which comes from its previous segment. The problem can be formulated as a linear programming problem to obtain an exact solution. Instead of using any formal method, however, a heuristic procedure is proposed as follows.

The procedure begins by specifying a big enough clock period for all paths that guarantees all paths not to fail and then starting the binary search to find the minimum clock period or maximum clock frequency so that all paths satisfy the timing constraints (e.g. as derived or determined from the SPICE netlist clock information). Preferably, it is better to start with a reasonably big period, which is as close to the starting period as possible, so that the number of iterations can be reduced. Here we choose a clock period such that the last segment in the failing path meets the timing constraint, making the whole path a good path. This initial period can be chosen to satisfy $$(x+d2)=(P+P_{on})$$

$$P_{on}=yP$$

Here, $P_{on}$ is the duration of the clock to be turned on, y is the ratio of $P_{on}$ to P, and this number is always fixed when P is varied. Then the final minimal operating clock period for the path must be between this initial P and current clock period. Choose this initial choice of P as $P_{max}$ and the current given clock period as $P_{min}$ to be the starting point of binary search and iterate the process until a final minimum clock period P is found for the given failing path. Follow the same procedure for all the failing paths and choose the maximum among the minimum operating clock period for each originally failing path so that all paths will satisfy the timing constraint. This is the final solution for the minimum operating clock period with its inverse as the maximum operating frequency for the circuit.

According to one aspect, and as illustrated in FIG. 3, a timing verification tool 200 according to the invention further includes a methodology for solving crosstalk or any interconnect problem. This method can be applied in timing simulation or timing analysis. This methodology will now be described in more detail.

Conceptually, the procedure is to get both the admittance matrix for RLC inputs and the voltage transfer information from RLC inputs to outputs in the frequency domain and integrate them with the nonlinear part of the circuit in the time domain so that a single run of simulation can calculate the delay from the input of the subnetwork containing the RLC part to the output of the RLC part.

The present invention recognizes that if only the admittance matrix for RLC inputs and outputs is used without using the voltage transfer information, the admittance matrix tends to be very big, causing too much overhead during simulation for both the driver part and the big admittance matrix. The size of the admittance matrix for just the RLC inputs can be substantially smaller than that of the admittance matrix for both inputs and outputs, thus saving significant processing steps. However, by using just the admittance matrix for inputs, only information for the RLC inputs can be obtained. Then, the waveform information for RLC inputs must be obtained and the voltage transfer information must be used to generate the RLC output result. This two-step approach is not only tedious but also gives rise to some numerical inaccuracy. The method according to one example of the invention, on the other hand, handles the admittance matrix and voltage transfer in one step, thus eliminating the burden imposed by separating the simulation into two parts, thus increasing both accuracy and speed for simulation.

The present invention formulates the problem as follows, $$CdV(t)/dt+N(V(t))=i_{in}(t)=L^{-1}(AV_{in}(s)+I_{init})$$

$$V_{out}(t)=L^{-1}(TV_{in}(s)+V_{init})$$

where V(t) is the node voltage vector, C is the capacitance matrix, N is the vector function of V(t) describing the driver which contains non-linear elements, i(t) is a vector of the instantaneous current flowing into the RLC part through RLC inputs, and A is admittance matrix, V(s) is the Laplace transform of V(t), both $I_{init}$ and $V_{init}$ refer to the initial conditions, and $L^{-1}$ is the inverse Laplace transform. This formulation is true for any number of inputs of RLC network. For analyzing a crosstalk problem, the number of RLC inputs must be greater than 1 for both victim and aggressors.

Since the procedures for RLC with one input and more than one input in fact are the same, the method will be explained in more detail below using one single input for RLC and one resistor for the driver containing one single resistor for the sake of brevity of notations. Assume that the admittance matrix and voltage transfer function are as follows:

$$A = a + b/(s+c)$$

$$I_{init} = b/c \, V_{in}(t=0)/(s+c)$$

$$T = d/(s+f)$$

$$V_{init} = d/f \, V_{in}(t=0)/(s+f)$$

The initial condition in the frequency domain can be figured out without any calculation by replacing $sV(s)$ with $sV(s)-V(t=0)$ if all nodes have the same initial value $V(t=0)$. For the crosstalk problem, assume there are two inputs, and that $sV_1(s)$ is replaced by $sV_1(s)-V_1(t=0)$ and $sV_2(s)$ is replaced by $sV_2(s)-V_2(t=0)$. This yields:

$$i_{in}(t) = L^{-1}((a+b/(s+c))V_{in}(s) + I_{init})$$
$$= aV_{in}(t) + \int_0^t b e^{-c(t-x)} V_{in}(x)dx + b/c \, e^{-ct} V_{in}(0)$$

During simulation the integration from $t$ to $t+\Delta t$ using backward Euler method, we have $$CV(t+\Delta t)/\Delta t + N(V(t+\Delta t)) = CV(T)/\Delta t - aV_{in}(t+\Delta t) - \\ be^{-c(t+\Delta t)} \left( \int_0^t e^{cx} V_{in}(x)dx + \left( \begin{array}{c} e^{c(t+\Delta t)} V_{in}(t+\Delta t) + \\ e^{ct} V_{in}(t) \end{array} \right) \Delta t/2 \right) - b/c \, e^{-c(t+\Delta t)}$$

From the above equation, $F(t)$ is defined as follows:

$$F(t) = \int_0^t e^{cx} V_{in}(x)dx,$$

$F(t)$ is obtained at the previous time step $t$ when evaluating at time step $t+\Delta t$.

By rearranging all the terms containing $V_{in}(t+\Delta t)$ from the right hand side to the left hand side, $V_{in}(t+\Delta t)$ can be solved. After this, $F(t+\Delta t)$ is updated using trapezoidal approximation as follows:

$$F(t+\Delta t) = \int_0^t e^{cx} V_{in}(x)dx$$
$$= F(t) + (e^{c(t+\Delta t)} V_{in}(t+\Delta t) + e^{ct} V_{in}(t))\Delta t/2$$

This term $F(t+\Delta t)$ will be used when integrating from $(t+\Delta t)$ to next time step $(t+2\Delta t)$.

For RLC output, we make use of the information for RLC input and voltage transfer function to get $V_{out}(t+\Delta t)$. We have $$V_{out}(t+\Delta t) = L^{-1}(d/(s+f)V_{in}(s) + d/f V_{in}(t=0)/(s+f))$$
$$= de^{-f(t+\Delta t)} \int_0^{t+\Delta t} e^{fx} V_{in}(x)dx + d/f V_{in}(t=0)e^{f(t+\Delta t)}$$

-continued $$= de^{-ft} \int_0^t e^{fx} V_{in}(x)dx + \\ d\Delta t/2(V_{in}(t+\Delta t) + e^{-f\Delta t}V_{in}(t)) + \\ d/f V_{in}(t=0)e^{f(t+\Delta t)}$$

Similar to the case admittance matrix, $G(t)$ is defined as follows:

$$G(t) = \int_0^t e^{fx} V_{in}(x)dx$$

At the time step $t+\Delta t$, $G(t)$ is already known. Then by inserting both $V_{in}(t+\Delta t)$ at the RLC input obtained from using admittance matrix and $G(t)$ into the above equation, $V_{out}(t+\Delta t)$ can be obtained. Update $G(t+\Delta t)$ by using $$G(t+\Delta t) = \int_0^t e^{fx} V_{in}(x)dx$$
$$= G(t) + (e^{f(t+\Delta t)} V_{in}(t+\Delta t) + e^{ft} V_{in}(t))\Delta t/2$$

This will be used in next time step $t+2\Delta t$. The whole procedure described here is used iteratively during simulation to solve $V_{out}(t)$ until simulation stops. Those skilled in the art will recognize that the methodology as explained above can be readily extended to a multi-input RLC like crosstalk problem with different initial condition at RLC inputs using the same formalism as here. The case for complicated admittance matrix and voltage transfer with more poles poses no problem.

It should be further noted that this method is suitable for any RLC part, not just for analyzing crosstalk issue. This provides a tremendous advantage for simulation, since the same RLC part does not need to be computed over and over again during simulation.

As for how to align an aggressor with respect to its victim in order to achieve the largest delay at the RLC output, a standard method can be used, assuming that there are no logic relations between aggressors and victim or between aggressors themselves. However, the results tend to be too pessimistic. Moreover, a failing path may consist of more than one signal which is affected by crosstalk. These crosstalk signals may affect each other, making this a chicken-and-egg problem.

According to another aspect of the invention, therefore, an algorithm is included to solve the crosstalk problem with a mixture of both uncorrelated and correlated aggressors for each failing path. This algorithm addresses four issues: using the switching of the input of the aggressor correlated with victim, distinguishing aggressors correlated with each other from those correlated to victim, providing a correct way of getting the switching of input of the uncorrelated aggressors and correlated aggressors among themselves, and providing an iteration procedure when victims and aggressors are affecting each other.

An example algorithm according to the invention will be explained in more detail in connection with FIGS. 16 to 19.

Initially, path analysis is performed to find the failing paths in the presence of the crosstalk effect, but not considering the logical relations between the aggressor and victim. Then function analysis is performed starting from nodes and side inputs of gates along each failing path, not including the inputs of gates driving aggressors, to uncover some input nodes of an aggressor gate being rise, fall, Vdd, or Gnd. Note that these aggressor node values cannot be changed so as to support the maximum or minimum delay for the victim. If the aggressor node has the value of rise or fall, then use the switching time and slope for this node as obtained from the path delay from the input of the path to this node.

Figure 16:
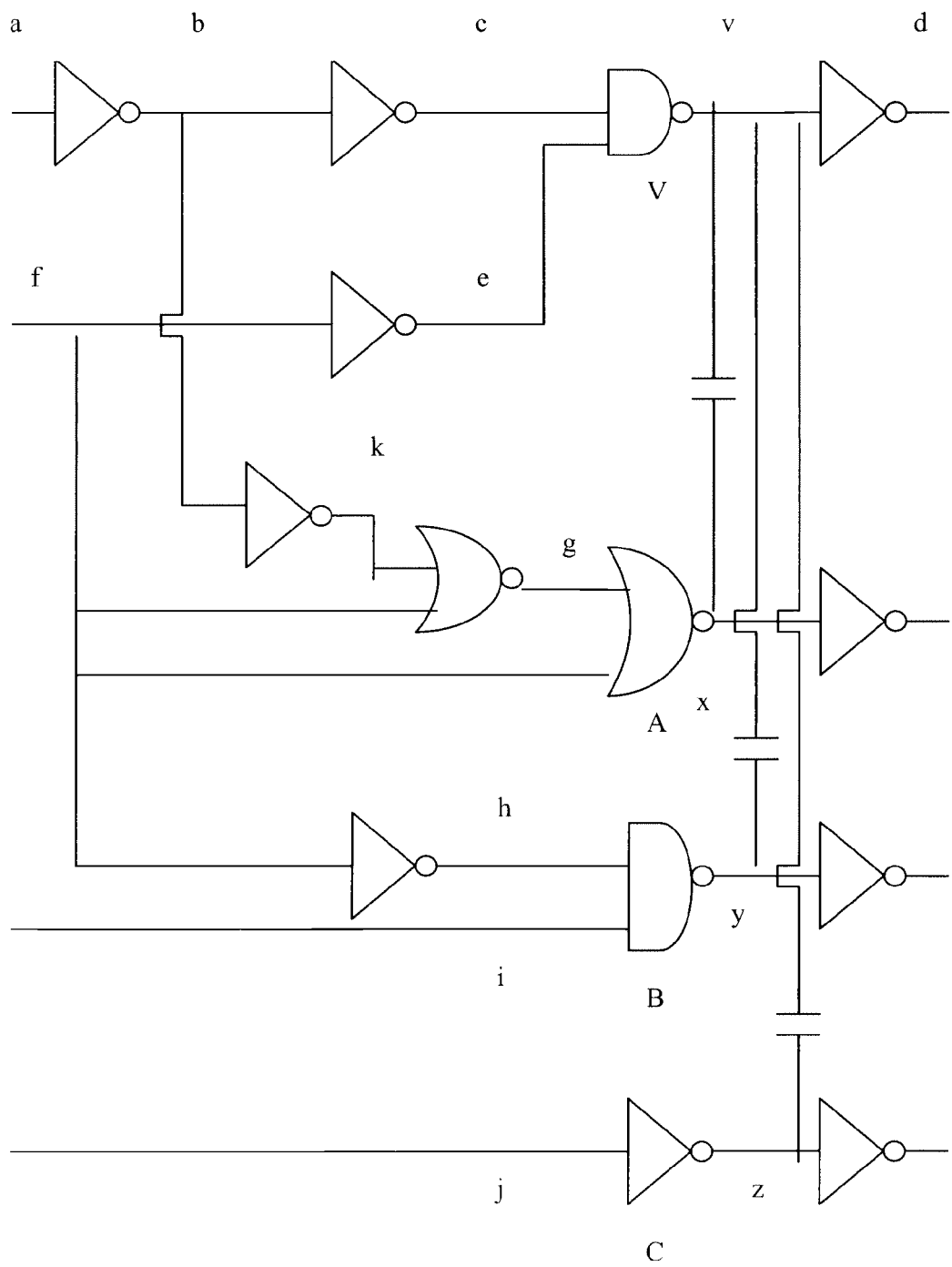
FIG. 16 is an example circuit for illustrating a preferred algorithm to calculate the victim delay correctly in the presence of crosstalk effect with a mixture of aggressors correlated to victim and aggressors uncorrelated to both the victim and themselves.

For example, from path analysis of the circuit in FIG. 16, the failing path is from a through b, c, and v to d. Node v is the victim driven by gate V, while g1, g2, and g3 are the aggressor nodes driven by three gates A, B, and C, respectively. The side input e of gate V must be Vdd to support the signal transition along the path. Then, from function analysis the logical values for the following nodes are f(Gnd), b(fall), k(rise), g(fall), h(Vdd), v(fall), g1(rise). This means victim v and aggressor g1 have logic values correlated to each other, as are the switching times at c and g. As for nodes i and j which are inputs to B and C driving aggressors g2 and g3, respectively, they are not affected by function analysis, thus having unknown values.

The next step is to find the switching time at g relative to that at c. Point to point analysis from node a to c and from signal a to g is used to get $delay_{a->c}$ and $delay_{a->g}$, respectively. Then, $delay_{a->g}$-$delay_{a->c}$ is the switching time at g relative to that at c. The switching times at nodes i and j for aggressors g2 and g3 with the driving gates B and C still need to be determined.

The conventional approach for handling B without considering the correlation effect between victim and aggressors used is to set aggressors A and C as being quiet. In the present approach, the preferred method is to only treat C as quiet. A, however, is always switching with its switching time at g being $delay_{a->g}$-$delay_{a->c}$. First, B is set to quiet, and waveform W(t) at the victim's output is determined. Then align B with victim D, and get another waveform Y(t). Take Z(t)=abs (X(t)−Y(t)) and the maximum of Z(t) is $V_{peak}$ at t=t1. Then move the peak of the noise a distance, for example x, to the point t2=t1+x where the voltage of the waveform W(t2) at the output of the victim is Vdd/2−$V_{peak}$. Then the switching time for B is x relative to the switching time of the victim.

To obtain the switching time for C, B is made quiet while C is switching and the same procedure as described above in treating the driver B is followed for C. Assuming linear superposition holds, the switching times for A, B, and C and victim are obtained. Using these switching times, the maximum delay for the victim D with crosstalk effect is obtained. This is the first iteration results.

Two cases need to be distinguished, one is the aforementioned correlation between victim and aggressors, and the other is the case of correlation only between aggressors. This is illustrated in FIG. 17, and an example algorithm used in accordance with this invention will now be described.

The aforementioned functional analysis is performed for each path to determine logical values for the input nodes of the drivers for the aggressors such as rise, fall, Vdd, and Gnd etc. Then, these aggressors are categorized as the ones with correlation with the victim. If the node value is rise or fall, its switching time relative to victim can be figured out exactly as previously discussed. For the input nodes of drivers for aggressors which are not affected by the first functional analysis, a second functional analysis is performed for them one by one to check if they are correlated among themselves.

Figure 17:
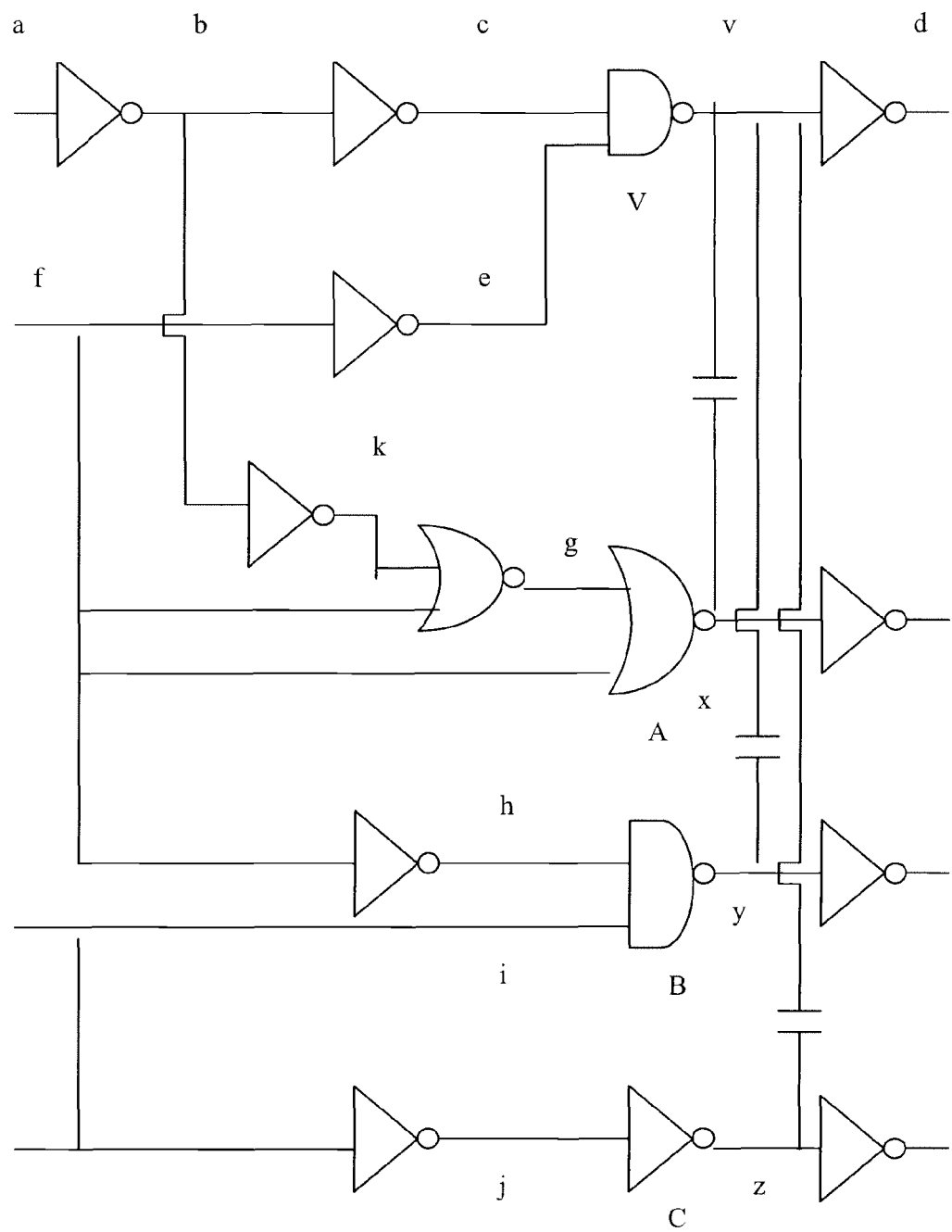
FIG. 17 is an example circuit with some aggressors correlated with each other further illustrating the preferred algorithm performed in connection with the circuit in FIG. 16.

For example, in FIGS. 16 and 17, the first functional analysis determines that nodes i and j are not correlated to the victim. However, in FIG. 17, after the second functional analysis it is determined that i and j are correlated to each other. There may be more than one group of input nodes of the gates driving aggressors correlated to each other being formed. The switching times for these said groups of inputs nodes are calculated separately. In FIG. 17, for the group of nodes i and j, one of the nodes, for example i, is aligned to the victim. The switching time of the other node j in FIG. 17 relative to node i can then be calculated.

To find the switching time of node i, the aforementioned standard procedure is used, namely, align i with respect to c for victim first, find the peak and move the peak to find its switching time relative to the victim. In the example in FIG. 17, node a rises and c rises also. To get the maximum delay from c to v, the aggressors need to switch in the opposite direction to that of the victim. Therefore, node i falls, leading to the rise of node j, since i and j are correlated. To make the result more accurate, the case in which node j falls, while i rises is also considered. From these two cases the worst case for maximum victim $delay_{c->v}$ is selected. Again, as emphasized above, aggressor g1 is always switching with fixed switching time at node g due to the correlation to the victim.

Figure 18:
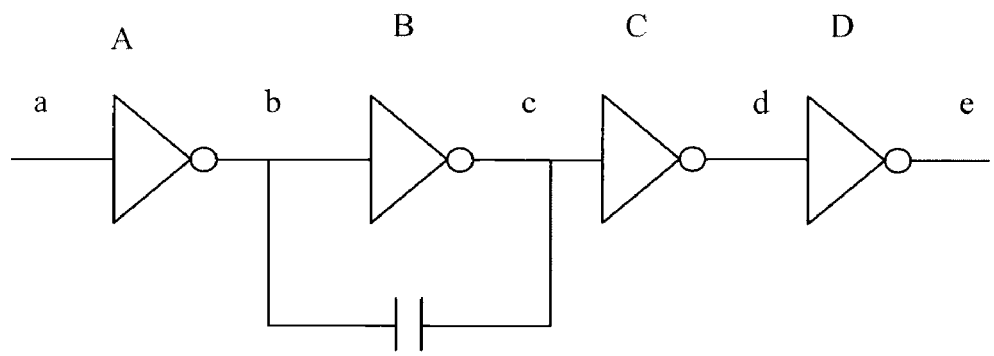
FIG. 18 is an example circuit illustrating the preferred algorithm to solve the victim delay iteratively when the victim output delay and aggressor input switching time affect each other.

According to an aspect of the invention, an iteration procedure is preferably used to get correct delay in the presence of crosstalk by considering correlation between victim and aggressors. The examples in FIG. 16 or 17 are simple in the sense that the switching time of A, B, or C is fixed without being affected by the newly calculated victim delay. FIG. 18 shows an example where the aggressor input switching time and victim delay interact with each other. Accordingly, this example is used to illustrate how an example algorithm according to this aspect of the invention works. For this simple example a simulation can be run efficiently.

In FIG. 18, a path a->b->c->d exists and there is a coupling capacitor between the nodes b and c. If gate A switches, the node b is considered a victim, while node c is the aggressor. In terms of a signal passing through gate B, the node c becomes the victim, while node b is the aggressor. Function analysis shows the logic values rise and fall for b and c, respectively. Consider the switching for gate A driving the victim node b. Since the input b of gate B driving aggressor node c has a logic value, meaning aggressor and victim are correlated to each other, the switching time of input node b of B relative to input node a of victim A is needed to calculate the delay of A with crosstalk effect.

The switching time of input node b of B relative to input node a of victim A is $delay_{a->b}$. This delay is obtained from the first iteration of the crosstalk calculation without considering the correlation effect. With this switching time for the aggressor, the delay for the victim, which is from b to c, is recalculated. This delay $delay_{a->b}$ happens to be the switching time of B (aggressor) relative to victim A (victim) and it is different from the previous value. Therefore, the victim delay needs to be updated. This explains why iteration is needed to get a final converged victim delay. An important aspect of this algorithm is to use updated switching time of the aggressor iteratively, assuming it is correlated to the victim, until there is no change of the switching time.

Figure 19:
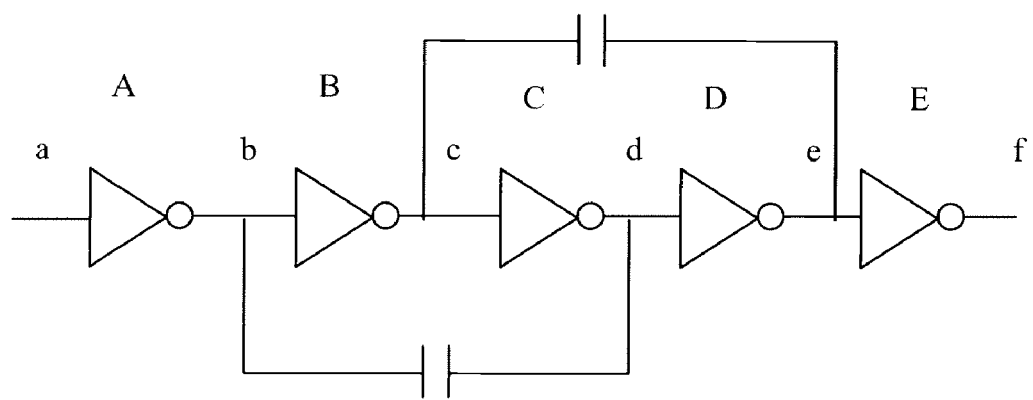
FIG. 19 is an example circuit further illustrating the preferred algorithm to solve the victim delay iteratively in connection of with circuit in FIG. 18.

Another example in FIG. 19 is provided to demonstrate further how the algorithm works for victim and aggressors being correlated in the crosstalk problem. In the path from a to f as shown in FIG. 19 there are two coupling capacitors. In discussing delay from a to b with crosstalk effect, similar to the previous example in FIG. 18, iteration is needed to reach convergence for a to b delay due to the change of the switching time at c, which is the input of C driving the aggressor node d, relative to node a, which is the input of A driving the victim node b. This relative switching time is $delay_{a->c}$. Then the delay from b to c can be calculated iteratively in the same way as the delay from a to b is calculated to get the final convergent result for delay$_{b->c}$ which is part of delay$_{a->c}$. Since delay$_{a->c}$, which is the switching time for the aggressor in computing delay from a to b, gets updated, new iterations are needed to recalculate delay$_{a->b}$.

This example shows that when the path contains several nodes with coupling capacitors, they may affect each other, making the problem much more tedious. Due to the interaction between these nodes with coupling capacitors as demonstrated here, it is preferable to carry out delay calculation for all nodes with coupling capacitors along the path sequentially within the same iteration, instead of handling each node iteratively to reach convergence and so this is the algorithm adopted in one example of the invention. An important aspect of this algorithm is to always use the most updated switching time for the aggressor relative to the victim.

For example, in a certain iteration the delays for gates B and C have been computed by considering crosstalk with correlation effect, both delays delay$_{b->c}$ and delay$_{c->d}$ are different from those obtained from the previous iteration. For the delay of gate D with crosstalk effect, the victim is e, while c is aggressor with the switching time at b, an input of B driving aggressor c, relative to that at d, input of D driving victim e, being equal to delay$_{b->c}$+delay$_{c->d}$. In the same iteration in which B and C delays were calculated, this newly computed delay$_{b->c}$+delay$_{c->d}$ should be used as the new aggressor switching time relative to the victim in calculating the victim delay from d to e. After finishing all nodes having coupling capacitors like nodes b, c, d, and e, go to next iteration and follow the same procedure until the change of victim input switching time does not change anymore.

It should be noted that a timing verification tool according to the invention may have one or more of the above-described capabilities in any combination, and any of these novel capabilities can be combined with conventional or other novel timing verification tools.

Accordingly, although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer-implemented method of verifying timing of a circuit having a portion with a transistor-level description, comprising:
    automatically decomposing the transistor-level description to extract a plurality of decomposed circuit structures; and
    performing timing analysis using respective pre-characterized timing information for the plurality of extracted circuit structures,
    wherein one or more of the automatically decomposing and performing steps are implemented by a computer.

2. A method according to claim 1, wherein the extracted circuit structures include driver-load gate, transfer gate, stage corresponding to channel connected transistors, and RLC part.

3. A method according to claim 1, wherein the circuit further includes an ASIC portion with a gate-level description, wherein the step of performing timing analysis is further based on the ASIC portion.

4. A method according to claim 1, wherein the extracting step includes:
    determining a tree-structure topology associated with one of the extracted circuit structures; and
    comparing the tree-structure topology with that of another one of the extracted circuit structures to identify a unique structure.

5. A method according to claim 4, wherein the comparing step includes searching from a top node in the topology recursively using depth first traversal.

6. A method according to claim 4, wherein the comparing step includes considering all configurations of children of a node in the topology if the node has a parallel attribute.

7. A method according to claim 4, wherein the comparing step includes considering a specific order of children of a node in the topology if the node has a series attribute.

8. A method according to claim 4, wherein the comparing step includes comparing transistor attributes in the two structures.

9. A method according to claim 4, further comprising:
    determining timing information associated with the unique structure.

10. A method according to claim 4, wherein the determining step includes:
    generating the tree-structure topology of a driver-load gate with a node representing parallel or series operation and a leaf node storing transistor information;
    joining transistors with the same direction of signal flow either in parallel or series;
    reducing the size of the tree-structure topology by collapsing two adjacent series nodes;
    storing the ordering of children of a parent node with series operation depending on how close to the voltage source the children nodes are; and
    assigning a key to each node depending on whether the node is for parallel or series operation, a level number of the node, and a number of children nodes.

11. A method according to claim 4, wherein the comparing step includes checking a key stored at each node of the tree-structure topology.

12. A method of verifying timing of a circuit having a portion with a transistor-level description, comprising:
    automatically decomposing the transistor-level description to extract circuit structures from the transistor-level description, including:
        determining a tree-structure topology associated with one of the extracted circuit structures; and
        comparing the tree-structure topology with that of another one of the extracted circuit structures to identify a unique structure;
    performing timing analysis based on the extracted circuit structures; and
    determining timing information associated with the unique structure, including:
        searching a path with a first portion from a triggered node to Vdd or Gnd and a second portion from the triggered node to output;
        carrying out function check by propagating rise or fall at the triggered node and source or drain node along the path;
        using X2Vdd, X2Gnd, Gnd2X, Vdd2X, Vdd, Gnd, rise and fall values for an affected node and propagating them further to seek more affected nodes and checking functional error until no more affected nodes are found;
        disabling side paths if nodes along the side paths have unknown values; and assigning rise or fall for each remaining input node without a known value and performing function check until one configuration is obtained without function error, wherein one or more of the automatically extracting, performing and determining steps are implemented by a computer.

13. A non-transitory computer-readable medium having instructions stored therein which, when executed by the computer, cause the computer to perform a method comprising the steps of:

automatically decomposing the transistor-level description to extract a plurality of decomposed circuit structures; and performing, by the computer, timing analysis using respective pre-characterized timing information for the plurality of extracted circuit structures.

* * * * *